Oct. 22, 1968     H. E. GRIFFITH ETAL     3,406,856
PACKAGE FOR PREPARED TART CRUSTS
Filed March 30, 1967
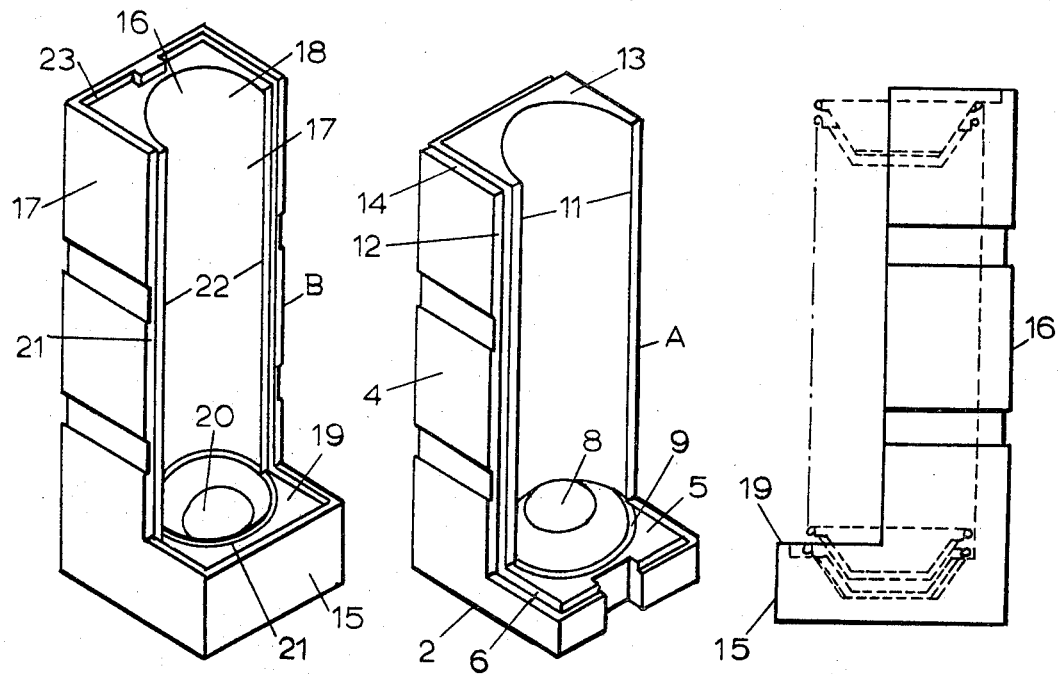
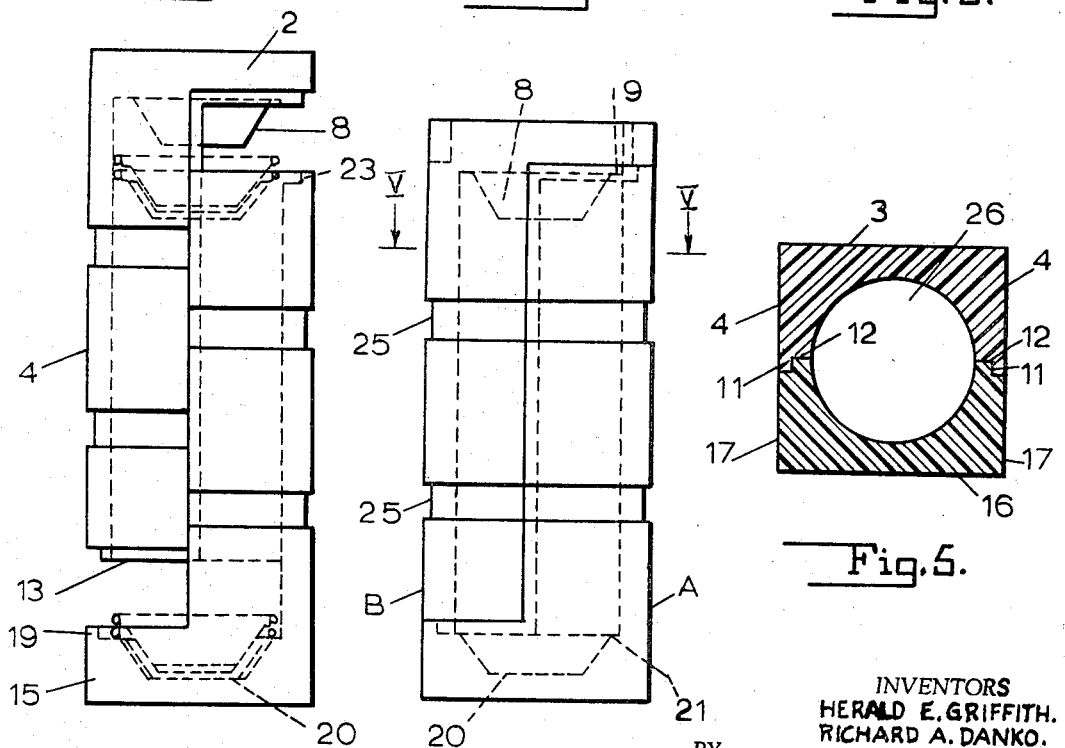
INVENTORS
HERALD E. GRIFFITH.
RICHARD A. DANKO.
BY
Christy, Parmelee & Strickland
ATTORNEYS.

United States Patent Office 3,406,856
Patented Oct. 22, 1968

3,406,856
PACKAGE FOR PREPARED TART CRUSTS
Herald E. Griffith, Glenshaw, and Richard A. Danko, New Kensington, Pa., assignors to Star-Kist Foods, Inc., McKees Rocks, Pa., a corporation of California
Filed Mar. 30, 1967, Ser. No. 627,179
3 Claims. (Cl. 220—4)

ABSTRACT OF THE DISCLOSURE

There is disclosed herein a receptacle for transporting, shipping and dispensing a stack of nested small disposable pie pans in which prepared crusts are formed for use in making pastries known as "tarts," and in the trade, the pans and crusts, without filling, are also known as "tarts," and this term has the latter meaning as used herein. The receptacle is formed of two parts molded from foamed plastic, each part having an end wall portion and matching edges of a side wall structure so formed that when the parts are together they form a parallelepiped within which is a cylindrical space of a diameter to receive a single stack of tarts. The end wall portion of one member has a cavity to receive the lowermost tart in the stack. The other end member has a projection on its inner surface designed to nest into the top pan of the stack. The two members may be placed together in confronting relation with a stack of tarts in the cylindrical cavity, pressed together to put the stack under pressure and hold the individual units against relative movement, and the two parts are then secured by external bands of adhesive tape. For dispensing, one of the two members is removed, leaving the other standing upright with the stack of tarts therein, and the tarts may be lifted one at a time from the stack.

---

This invention is for an improvement in the invention disclosed in our copending application Ser. No. 515,299, filed Dec. 21, 1965, particularly insofar as that application is applicable to prepared crusts of a miniature size, known in the trade as "tart crusts," and more often referred to in the trade simply as "tarts."

In the application above referred to, pie crusts, particularly graham cracker crusts, are prepared in disposable pans. The pans with the crusts formed therein are nested one above another into a stack, and the stack is placed in a receptacle having a cavity in the bottom to receive and support the lowermost pan, and an empty pan is placed in the topmost crust. There is a lid or cover member having a projection shaped to enter the empty pan at the top, and the stack is of a height slightly greater than the height of the interior of the receptacle when the lid is in place. The lid is forced down, wedging each pan into the crust beneath it, the sloping flange of the pan in the stack being thereby forced outwardly, until the cover is closed, when it may be secured in place. The stack is thus under pressure, and no individual pan can move or shift relatively to another, so that the crusts are protected from breakage during transfer from a place of manufacture to a bakery, or institution, or elsewhere where they are to be used.

While this is a convenient package for standard pie pans and crusts, and may be adapted for miniature size pans with crusts, commonly referred to as "tarts," the purpose of the present invention is to provide a much more convenient and economical package for shipping and storing tarts, involving, however, the nesting of the tarts into a stack and compressing them as described in our earlier application.

According to this invention, a receptacle is formed into two parts, each having an end wall portion and matching halves of a side wall structure so formed that when the parts are put together, they form a parallelepiped within which is a preferably cylindrical enclosure of a diameter to receive a single stack of crusts formed in individual disposable tart pans. The end wall portion of one member has a cavity to receive the lowermost pan of the stack, and the other end member has a projection designed to fit into an empty pan at the top of the stack. The two members may be placed together in confronting relation and then, by applying pressure to the two end portions, the parts will slide, one on the other, to compress the stack. Provision is made for holding the parts together after the packaging is otherwise complete, the exterior of the side wall portions of the matching parts being grooved to receive one or more encircling bands of adhesive tape. The confronting wall portions are rabbeted to provide interfitting flanges and ledges so that the parts, when secured, cannot move with respect to each other, and dust, dirt and insects are excluded.

The invention may be more fully understood by reference to the accompanying drawings, in which:

FIG. 1 is a perspective view of one of the two parts of the receptacle;

FIG. 2 is a similar view of the matching part;

FIG. 3 is a side elevation of the two parts placed together, but not fully closed, to show the manner of assembling them;

FIG. 4 is a side elevation of the completed package;

FIG. 5 is a transverse section in the plane of line V—V of FIG. 4; and

FIG. 6 is a side elevation showing one of the parts on end for holding the pan-filled crusts for convenient dispensing.

Referring to the drawings, it may be first explained that for institutional and commercial distribution, tart crusts are commonly packaged with forty-eight individual crusts, each with its individual pan in which the crust is molded or formed. The package herein described is therefore designed to hold a stack of forty-eight individual crust and pan units, but the invention is not limited to this number, but the invention will be hereinafter described using this number only for purposes of illustration.

As heretofore indicated, the receptacle is comprised of two sections, each resembling the shape of the letter L, and here designated A and B, arranged to be used in matching or complementary pairs. When the package is stood upright on end, as will commonly be the case, A is the top member, and B the bottom member, and for convenience this terminology will be used, but without limitation as to the actual position of the parts. The parts may be formed of any desirable material, as paper pulp, and plastics of various kinds. We prefer to use rigid foamed polystyrene which is commonly used for packaging and insulating containers of various kinds.

The so-called top part A has an end wall portion 2 and a half side section at right angles to the end wall comprising a full side panel 3 and two half side panels 4. The end wall 2 is formed on its inner face with raised or offset area 5 forming a ledge 6 about that half of the end wall that projects beyond the boundaries of side wall portions 4. Centered on the inner face of the end wall portion is a projection 8 in the form of a truncated cone adapted to be exactly fitted into an empty tart pan, with the rim of the pan abutting a countersunk groove 9 about the base of the projection.

The half side section of part A provides a semi-circular trough-like cavity 10 extending throughout its length, and the two half side walls are rabbeted in such manner that each is provided with an upstanding lip 11 along its inner edge, the outer face of this lip being in the same plane as the outer face of the offset 5 of the end wall. There is a ledge 12 along the outside of this lip. The end face of this part of the container remote from the top wall also has an offset 13 thereon about which is a ledge 14 of the same width as the ledge 12 and the ledge 6.

The other or bottom section B of the container is of the same general contour as part A, in that it has an end wall portion 15 and a half side wall section at right angles to the end wall, and it has a full side panel 16 and two half side panels 17, defining a semi-circular trough-like cavity 18 similar to cavity 10 of the section A. The end wall portion of the bottom or B section is preferably thicker than the corresponding part of section A, but the side wall-forming portion is the same length as the corresponding portion of section A. The bottom or end wall portion 15 of section B has an upstanding lip 19 around that half of its inner face which extends beyond the side wall half panels 17. This lip is of a width equal to the width of ledge 6 of the member A, and its projection beyond the face of the end wall is equal to the height of the offset 5 on the end face of the top wall 2 of part A. There is a circular recess or cavity 20 in the inner face of the bottom end wall 15 of a shape and depth to receive a crust and pan unit, with the rim of the pan unit resting on the flat surface 21 around the cavity, this cavity having inwardly-sloping side walls so that it is of downwardly-decreasing diameter.

The top edges of the half side walls 17 of the part B of the receptacle have an upstanding lip 21 along its outer edge and a ledge 22 along its inner edge, just the reverse of the lip and ledge of the part A, forming a rabbeted interfit for the reversely-rabbeted edges of the member A. The open end of the member B remote from the bottom portion 15 also has a projecting lip 23 therearound into which the raised end portion 13 of the member A may nest.

In use the two members are put together in relatively reversed relation. The reversed arrangement of the ledges and grooves on the two members provide reversed rabbeted or interfitting joints everywhere the two parts come into abutting contact. A stack of nested crust units each comprising a small pie-shaped pan with a beaded outer edge and lined with a crust, as a graham cracker crust, is prepared. As above indicated, there would commonly be forty-eight of these units in a package, and there is an empty pan placed in the uppermost crust. The stack may be placed in the bottom member B, the lowermost unit in the stack setting in the recess 20, much as shown in FIG. 7, but the top of the stack will initially extend slightly above the upper end of the bottom member. The upper member or section A of the receptacle is then positioned against the lower one with the projection 8 of the top 2 overhanging the empty pan in the top of the stack and the interfitting rabbeted edges of the half sides of the two parts brought together. The two members are then subjected to endwise pressure, slightly increasing the diameter of each pan, as explained in the copending application above referred to, until the rabbeted open ends of the respective members are interfitted with the reversely-rabbeted area of the closed end wall of the other member. By thus holding the stack under compression, relative movement of any unit in the stack is prevented.

When the two parts are thus put together, adhesive tape is passed around the receptacle, the exterior of each part having preferably two spaced peripheral grooves 24 therearound, which register with grooves on the other part to receive this tape. The interfitting rabbeted joints between all contacting surfaces of the two parts excludes dust and vermin and restrains the parts against relative movement.

When the package is to be opened, the tapes, designated 25 in FIG. 4, are cut in the plane of the meeting half side walls of the two members, and with the base 15 down, the top member is lifted away, leaving the stack of crust units supported as shown in FIG. 7. The chef or cook may then conveniently remove one crust unit after another from the top of the stack, so that the package then becomes a convenient dispenser.

When the two parts are together in confronting relation, the semi-circular trough-like cavities of the two members form a circular cylindrical chamber 26 which is sufficiently larger than the diameter of the pan and crust units when they are initially placed in position to enable the pans to increase in diameter as the stack is put under pressure.

In the preferred embodiment of our invention, each part of the receptacle is generally in the shape of the letter L, the foot of the L being the end wall, and the side wall portion being the vertical leg, but when the two parts are fitted together, one part is reversed with respect to the other. The trough-like cavity in each member is preferably semi-circular to conform to the contour of the stack of units and provide support around the stack after it has been compressed. The outside shape of each end wall preferably, but not necessarily, is square, while the side walls of the receptacle are preferably rectangular. The completed package forms a parallelepiped. A number of these units, usually six, may be snugly fitted into a cardboard carton. To facilitate the removal of a package from the carton, to readily indicate which is the top, and provide for carrying and holding the receptacle top side up, the top end wall is provided on two opposite sides with finger notches 26 and 27, notch 26 being a recess, while notch 27 extends through the end wall, but in the complete package the end of the bottom member closes the inner end of the notch. By placing one's thumb in one notch and forefinger in the other, the package may be easily picked up and carried. While the receptacle is capable of reuse, it is cheap enough so that it may be, and ordinarily will be, discarded after a single use.

While we have shown and described a preferred construction embodying our invention, it will be understood that various changes and modifications may be made therein within the contemplation of our invention.

We claim:

1. A receptacle for receiving, transporting and storing a number of crust and pan units in nested stacked relation, the receptacle comprising two complementary sections, each being of an L shape with an end wall portion forming the foot of the L shape and the vertical leg portion of the L shape being of a trough-like shape open at one end and closed at the other by the end wall portion and the leg of one section being of substantially the same length as the corresponding portion of the other, said sections being fitted together in reversed relation so that the open end of each trough-like leg portion abuts against the end wall of the other section, the troughs of the two sections then being in confronting relation and forming the enclosure in which the stack of crust and pan units is received, severable means for holding the sections together when they are placed together with the stack of units therein, the end wall portion of one section having on the inner face thereof a cavity shaped to receive the pan and crust unit at the bottom of the stack, and the end wall portion of the other section having on the inner face thereof a projection shaped to fit into and conform substantially to the interior of one of the pans from which the crust and pan units are formed.

2. A receptacle as defined in claim 1 in which the enclosure defined by the opposed trough-like leg portions is circular in section while the exterior of the receptacle when the two sections are together is a parallelepiped with square ends and rectangular sides.

3. A receptacle as defined in claim 1 wherein the exterior of the receptacle when the sections are together form a parallelepiped adapted to be set in an upright position with square ends and rectangular side walls, the end wall of the section which has the cavity therein being the bottom, and the end wall of the other section having the projection being the top, the peripheral edges of the top having finger-receiving notches therein to enable the receptacle to be held and carried in one's hands in an upright position.

References Cited

UNITED STATES PATENTS

| 2,365,836 | 12/1944 | Patridge | 220—4 |
| 3,103,278 | 9/1963 | Kuzma | 206—65 |

FOREIGN PATENTS

| 962,382 | 7/1964 | Great Britain. |
| 557,554 | 5/1958 | Canada. |

GEORGE E. LOWRANCE, *Primary Examiner.*